United States Patent [19]

Burgess

[11] 4,269,562

[45] May 26, 1981

[54] TRENCH TRASH COMPACTOR

[76] Inventor: James B. Burgess, Drawer E, Divide, Colo. 80814

[21] Appl. No.: 931,473

[22] Filed: Aug. 7, 1978

[51] Int. Cl.[3] .......................... B60P 1/00; B65B 63/00

[52] U.S. Cl. .................................... 414/515; 100/278; 405/129

[58] Field of Search ........................ 414/515, 747, 525; 100/278, 215, 249, 95; 405/128, 129, 282, 283, 144; 111/405; 37/142., 80 R; 104/247, 245, 139

[56] References Cited

U.S. PATENT DOCUMENTS

| | | | |
|---|---|---|---|
| 1,096,051 | 5/1914 | Nabb | 100/100 |
| 2,909,295 | 10/1959 | Weir | 414/515 |
| 3,059,569 | 10/1962 | Nolt | 100/245 |
| 3,446,026 | 5/1969 | Fikse | 100/95 |
| 3,643,824 | 2/1972 | Partridge | 414/525 |
| 3,872,794 | 3/1975 | Goode | 104/247 |
| 3,968,619 | 7/1976 | Fishburne | 100/249 |

*Primary Examiner*—Leslle J. Paperner
*Assistant Examiner*—L. E. Williams
*Attorney, Agent, or Firm*—Richard W. Hanes

[57] ABSTRACT

A self moving landfill refuse compactor for operation in a ditch or trench in the earth having a refuse chamber with a top openable for receiving refuse from a delivery truck and a powered ram slidably disposed in the refuse chamber and defining a movable end wall for the chamber and having a raisable gate across the chamber which defines a discharge end of the chamber.

1 Claim, 11 Drawing Figures

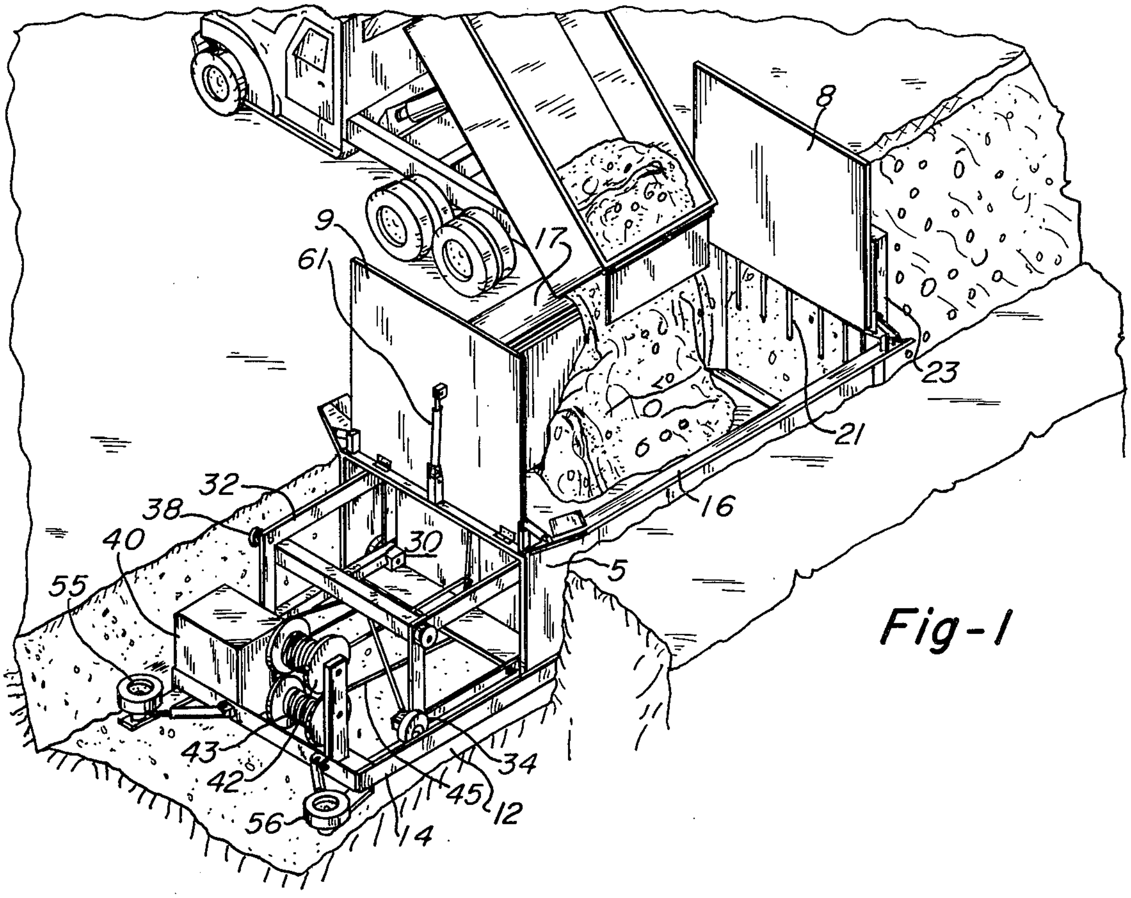
Fig-1
Fig-2
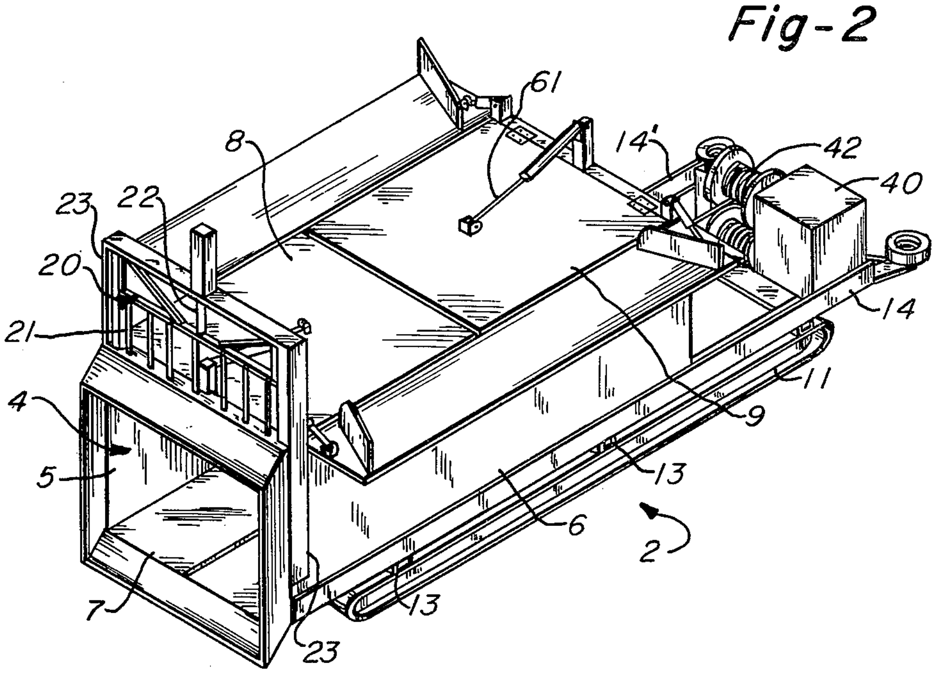

TRENCH TRASH COMPACTOR

The present invention relates to improvements in landfill refuse compactors such as the one generally described in U.S. Pat. No. 3,446,026 to T. H. Fikse.

Fikse describes a machine for compacting refuse in a trench, however his machine is limited in capacity and simplicity because of the emphasis placed on the depth at which the refuse must be buried. This conceptual limitation creates complications in the structure as well as diminishing the benefits of this method of trash disposal. Land fill areas devoted to disposal uses do not require great consideration as to depth of burial and excessive consideration of this point results in wasted land and creates additional expense in providing immediate and significant soil cover to hold the compacted refuse in place.

It is the primary object of the present invention to simplify the construction and operation of trench trash compactors and provide simplified means of holding a compacted charge of refuse in place while the packing ram is being readied for another cycle.

A second object of the invention is to provide simplified and effective means for driving the packing ram and simultaneously providing motive force for moving the compactor as a function of a constant predetermined density of refuse packed in the trench.

Other and further objects, features and advantages of the invention will become apparent upon a reading of the following detailed description of a preferred form of the invention taken in conjunction with the accompanying drawings in which:

FIG. 1 is a perspective frontal view of the compactor of the present invention disposed in a trench and receiving refuse through the open top doors.

FIG. 2 is a perspective rear view of the compactor showing the refuse receiving door in a closed position.

Figure 3:
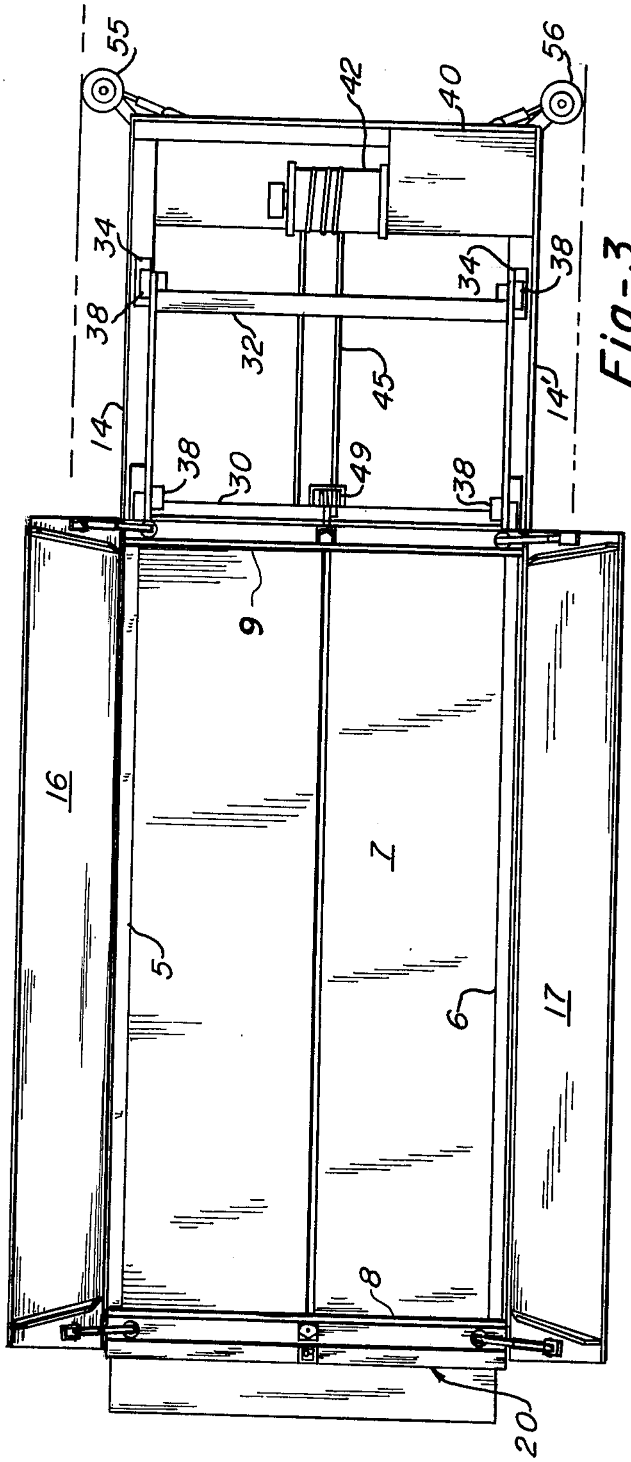
FIG. 3 is a top view of the compactor with the refuse receiving doors open and showing the sides of the trench in which the compactor operates.

Referring to FIG. 2 for a general view and description of the apparatus of the present invention, it is seen that the trench trash compactor comprises a trash receiving chamber 4 defined by a housing having a pair of parallel spaced apart side walls 5 and 6, a bottom floor 7 and an openable top consisting of a pair of hinged doors 8 and 9. The chamber housing is carried by parallel sled runners 11 and 12 interconnected by suitable cross bracing numbers 13 and longitudinal frame members 14 and 14'. The runners are adapted to slide along the bottom surface of whatever ditch, trench or depression in which the compactor is to work. To bridge the space between the housing side walls 5 and 6 and the vertical sides of a trench in which the machine may be disposed, there are provided a pair of ramp wings 16 and 17 hingedly connected to the top edge of the side walls 5 and 6 respectively. Perpendicular to the plane of the rear chamber opening is a grate 20 which is raised during compaction operations and lowered immediately thereafter to maintain the packed refuse in position while another charge of refuse is being taken into the chamber 4. The grate 20 is provided with a plurality of vertically disposed parallel bars 21 carried by a frame 22 which is slidably mounted in parallel guide rails 23. The grate may be operated by a hydraulic lifting jack or similar device.

Figure 4:
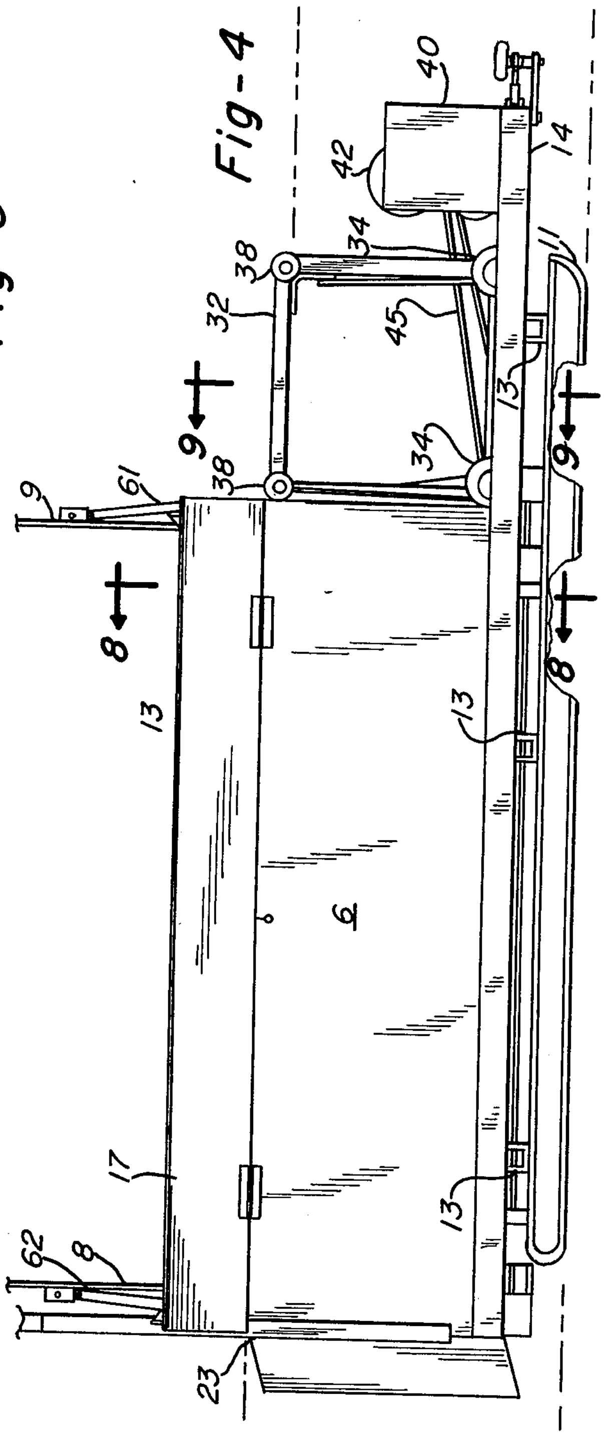
FIG. 4 is a side view of the compactor with the refuse receiving doors open and the side ramp wings in an elevated position.
Figure 5:
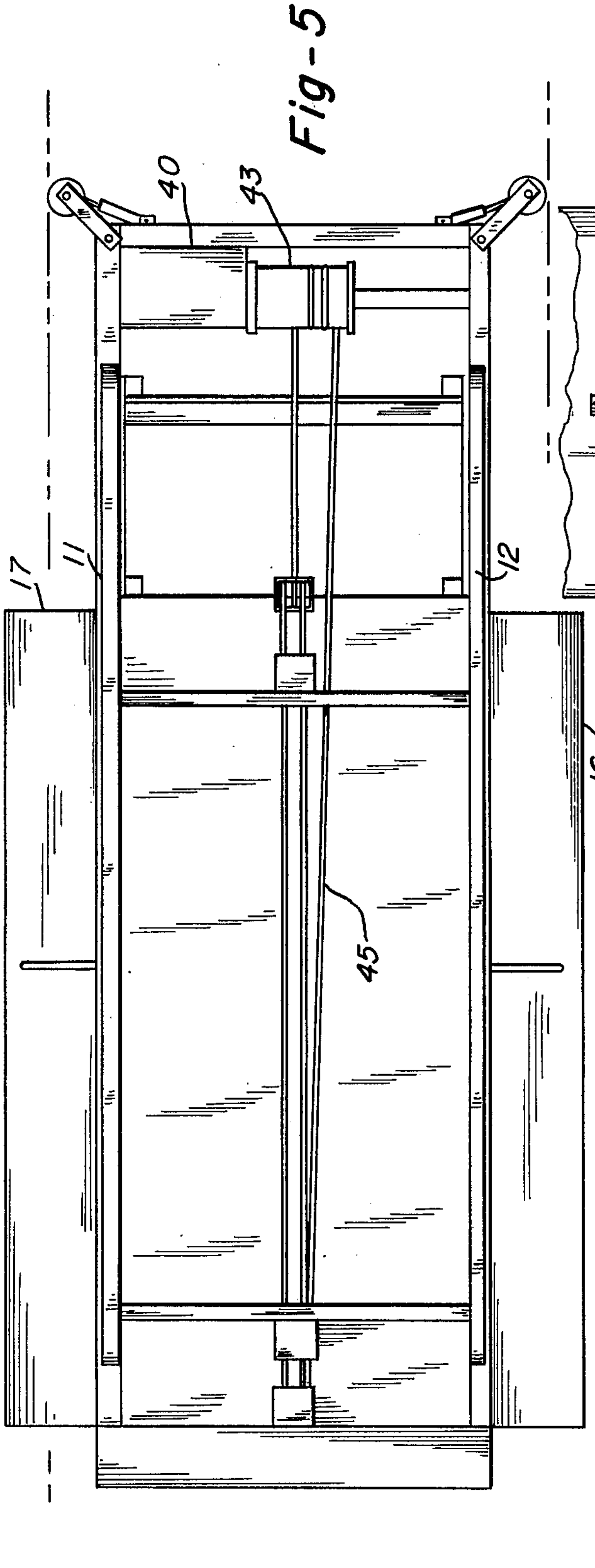
FIG. 5 is a bottom view of the trash compactor.
Figure 7:
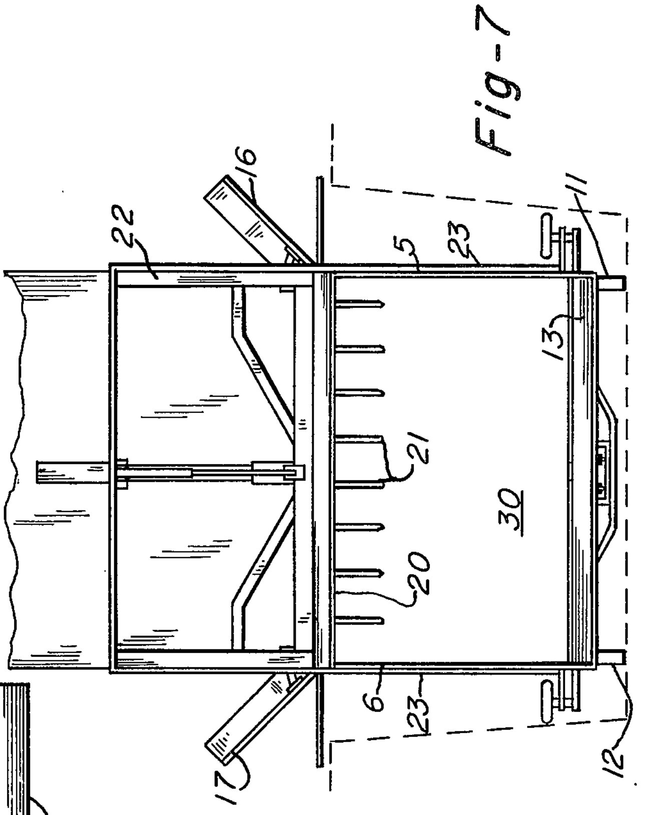
FIG. 7 is a front view.
Figure 6:
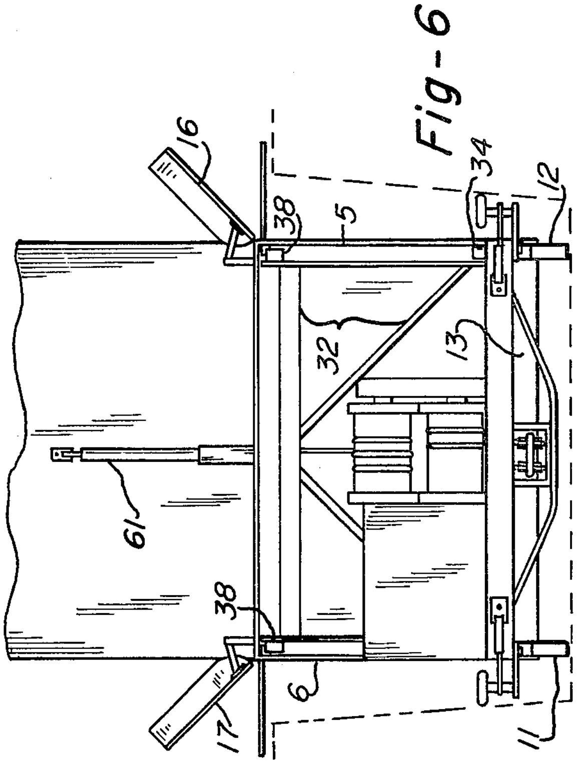
FIG. 6 is a rear view.

The construction of the packing ram or piston 30 is most clearly seen in FIGS. 3, 4 and 5. The ram 30 is a flat rigid plate dimensioned to slidably fit within the chamber 4 when the face of the ram is positioned perpendicularly to the longitudinal axis of the chamber 4. The ram plate 30 is mounted on the front of a rigid frame 32 movable on its wheels 34 which run inside the "L" shaped housing frame members 14 and 14' and the bottom floor member 7 of the chamber housing. The top members of the frame 32 are guided inside the chamber housing by rails 36 on which roll the upper frame guide wheels 38 journaled in the upper members of the frame 32.

Different means may be employed to power the packing ram 30 such as hydraulic jacks, however the device shown in the drawings for this purpose comprises an engine, generally indicated by reference numeral 40, which powers two cable winches having take up and supply drums 42 and 43 on which are wound the haul cable 45.

Figure 11:
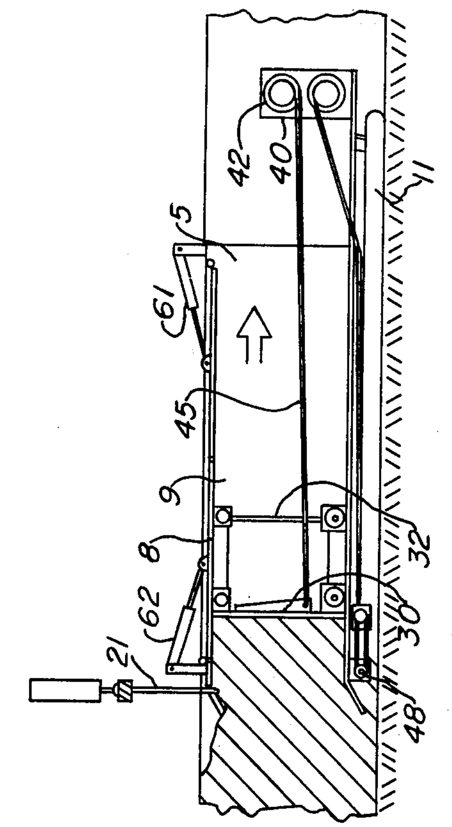
FIG. 11 is a side view similar to that of FIG. 10 showing the packing ram in a substantially fully compacted position with pressure applied so as to create rearward movement of the compactor sled and body in the trench.
Figure 10:
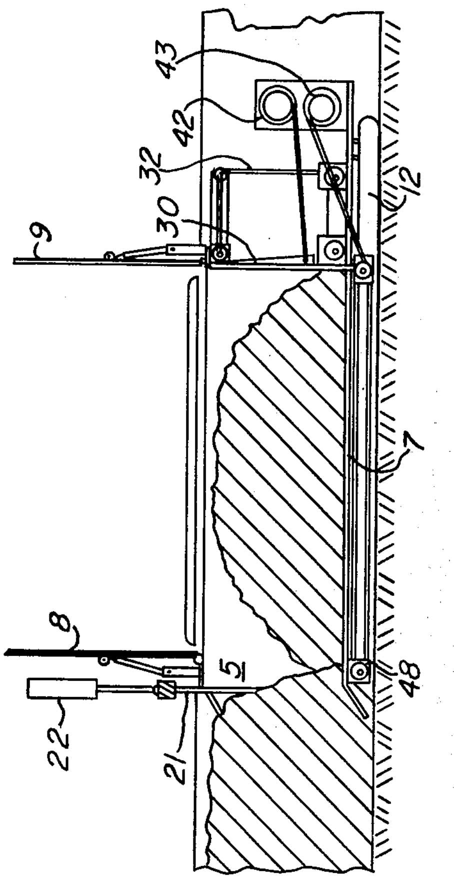
FIG. 10 is a longitudinal vertical section through the compactor showing the position of parts after the refuse chamber has been filled and before the packing ram has been actuated.
Figure 9:
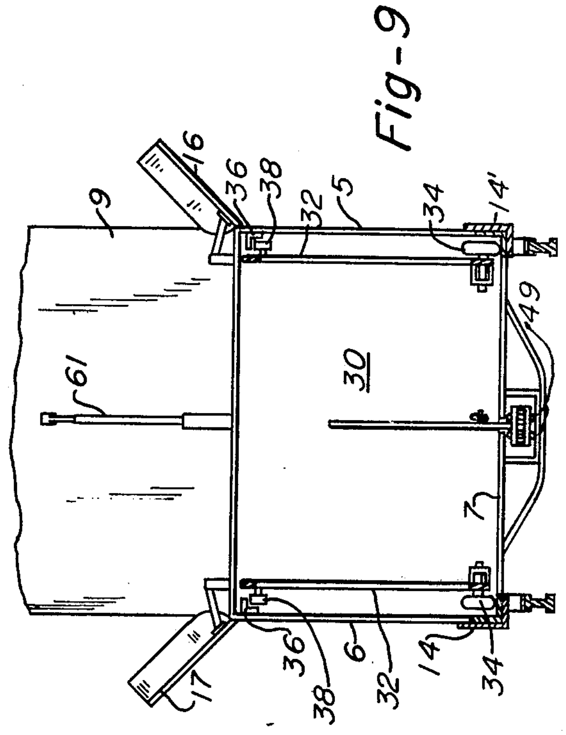
FIG. 9 is a cross sectional view taken along lines 9—9 of FIG. 4.
Figure 8:
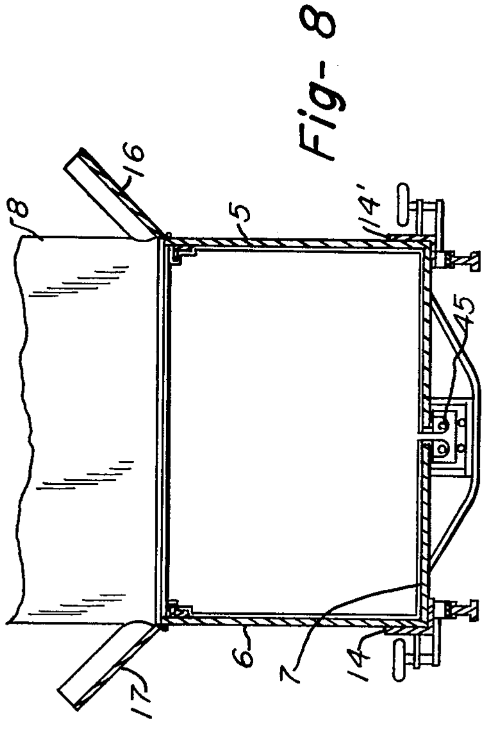
FIG. 8 is a cross sectional view taken along lines 8—8 of FIG. 9.

Through the mechanical advantage of a block and tackle arrangement the cable 45 produces sufficient pulling force on the packing ram to push refuse longitudinally out of the chamber 4 and compress it at the end of the trench, as shown in FIGS. 10 and 11. The block and tackle arrangement comprises a pair of rotatably mounted sheaves 48 journaled for rotation in the members of the chamber housing frame near the front open end thereof and a similar pair of sheaves 49 carried by and below the ram frame 32. Around these sheaves 48 and 49 is trained the haul cable 45 in a manner well known in the art so that when the drum 43 is rotated to take up cable, drum 42 is supplying cable and the ram is pulled toward the open front end of the chamber 4 to discharge refuse. Conversely when the engine 40 reverses direction and the drum 42 is reeling in cable the ram 30 is withdrawn from its position shown in FIG. 11 to the position shown in FIG. 10.

In order to progressively pack refuse in an elongated earthern trench provision is made to move the compactor along the trench using the same power source and mechanical apparatus as are used to compress the refuse. At a point in time when the force necessary to further compress the refuse in the trench exceeds the force necessary to slide the compactor on its runners in the trench, further force application by the ram 30 against the compressed trash will result in movement of the machine 2 lengthwise of the trench. Guide wheels 55 and 56 are mounted on the housing frame members 14 and 14' to prevent cocking and jamming of the machine in the trench.

In operation the compactor is placed in an elongated trench and refuse is dumped into the refuse chamber, as seen in FIG. 1. The doors 8 and 9 are shut and locked, as with hydraulic jacks 61 and 62. By engaging the engine 40 the ram 30 is pulled toward the front of the chamber 4, compressing and compacting the contents of the chamber as it moves, as previously explained. When the trash is compacted continued force on the ram acts to move the compactor backwards in the direction of the arrow in FIG. 11. When the ram is withdrawn the grate 20 is lowered to hold the compacted contents in place until the next stroke of the ram when the grate 20 is lifted out of the way.

I claim:

1. A refuse compactor for operation along the length of an earthen trench comprising:

a refuse receiving chamber having spaced apart parallel side walls, a floor and an openable top;

ram means slidably disposed in the receiving chamber longitudinally thereof and defining a movable end wall for the chamber and adapted to push refuse out of the receiving chamber;

drive means carried by the receiving chamber and operably connected to the ram means for providing relative movement between the ram means and the chamber;

a vertically disposed grate comprising a frame of parallel bars forming one end wall of the receiving chamber for movement between a raised open position and a lowered closed position and adapted to remain in the raised open position during operation of the ram means to push refuse out of the chamber and further adapted to remain in the closed position during withdrawal of the ram means into the receiving chamber; and a plurality of guide wheels carried by the chamber and disposed exteriorly thereof for rotation so that their axes of rotation are substantially vertically perpendicular to the longitudinal axis of the chamber.

* * * * *